July 8, 1952  J. G. SALIDO  2,602,481
FRUIT PEELER
Filed Feb. 19, 1951
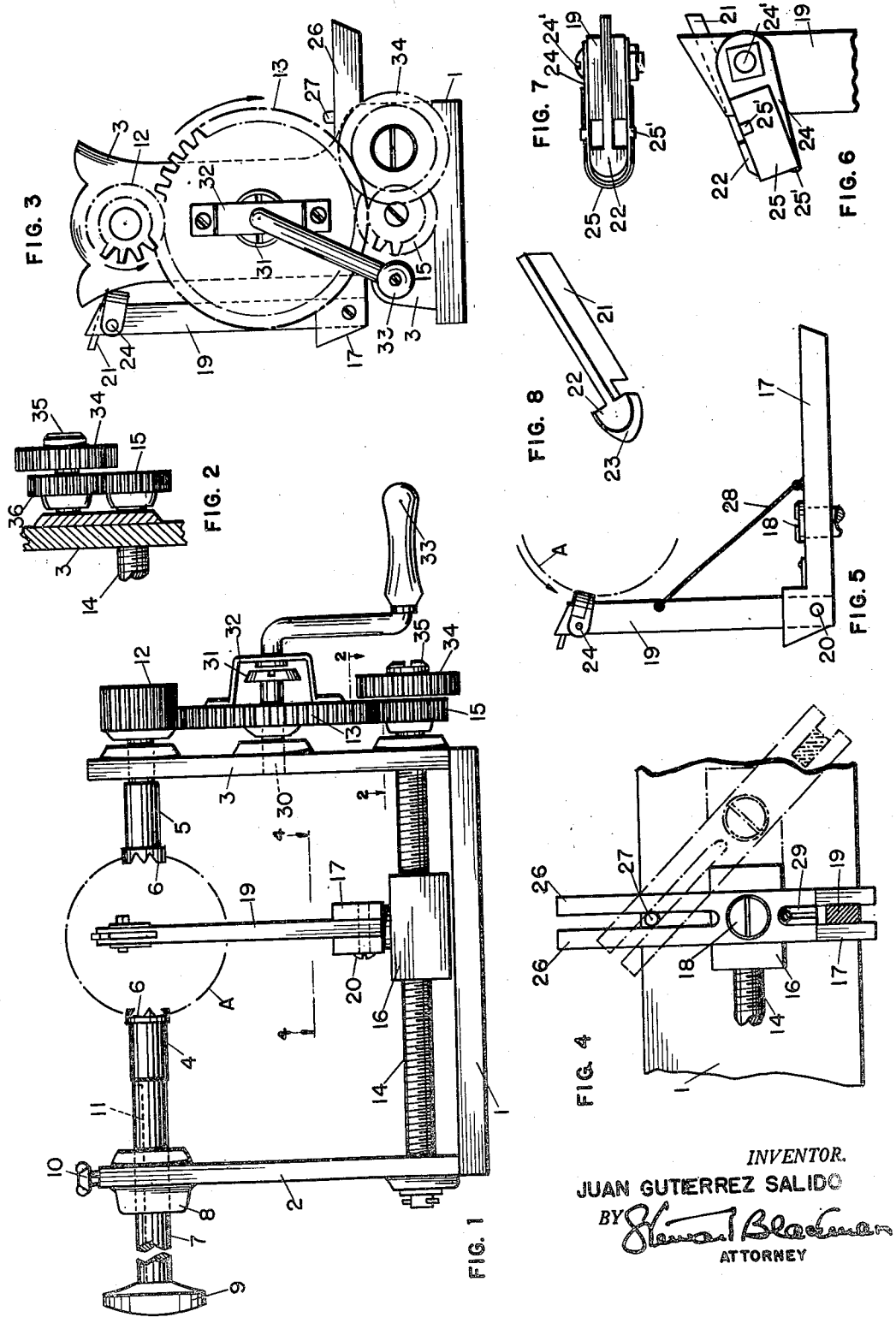
INVENTOR.
JUAN GUTIERREZ SALIDO
BY *Stewart Blackman*
ATTORNEY Patented July 8, 1952

2,602,481

UNITED STATES PATENT OFFICE 2,602,481

FRUIT PEELER

Juan Gutierrez Salido, Central Preston, Cuba

Application February 19, 1951, Serial No. 211,640

4 Claims. (Cl. 146—43)

This invention relates to an improvement in fruit peelers.

The fruit peeler to which the invention has particular application has utility as an orange peeler wherein the peel is pared by a cutting edge having substantially arcuate movement about the fruit but is not limited, within the purview of the invention, to fruit of a specific species.

It is one of the objects of my invention to provide a device which is efficient in operation, economical in practice, and convenient in use.

Another object is to provide a fruit peeler which may be readily and economically manufactured.

Other advantages of the invention will be discernible from the detailed description thereof to be hereinafter set forth.

According to the invention, the fruit peeler comprises a frame, a rotatable fruit clamp journaled therein, a screw shaft journaled in the frame and a carriage block splined thereon for reciprocal movement therealong, a paring assembly carried by the carriage block and pivotably related thereto to move the paring edge in substantially arcuate travel about the fruit, gear train means driving the fruit clamp and screw shaft, a driving gear actuating the gear train means and shiftable to effect reciprocation of the screw shaft to, in turn, effect reciprocal arcuate movement of the paring assembly.

The invention is embodied in a fruit peeler exemplified in the accompanying drawings wherein the views are as follows, like reference numerals identifying like parts throughout the several views:

Fig. 1, a front elevation of the invention;

Fig. 2, a section taken on line 2—2, Fig. 1;

Fig. 3, an end elevation of the view shown in Fig. 1;

Fig. 4, a section taken on line 4—4, Fig. 1;

Fig. 5, a side elevation of the cutter assembly and supporting radius bar therefor;

Fig. 6, a partial side elevation, enlarged, of the cutter assembly; and

Fig. 7, a plan thereof; and

Fig. 8, an isometric view of the cutter head.

The fruit peeler has a frame comprising a bed plate 1, the ends of which support a pair of upright brackets or posts 2 and 3.

Arranged in the upper portion of this frame, is a fruit clamping assembly consisting of a pair of axially alined rotatable shafts 4 and 5, the inner ends of which are spaced apart and fitted with inwardly projecting pronged flanges 6 adapted to receive and grip the fruit as, for example, an orange A, therebetween. The leftmost shaft 4 is sleeved in any suitable manner known in the art upon an extension shaft 7 forming a spindle therefor. The extension shaft has slideable movement through a bearing 8 formed in the post 2.

The extension shaft is fitted at its outer end with a knob 9 to facilitate its adjustment in determining the space between the clamping shafts for the accommodation of fruit of different sizes therebetween and a set screw 10, threaded into the top of the end post 2, is engageable with a longitudinal groove 11 formed along the top of the extension shaft to prevent the inadvertent displacement thereof.

Fixed on the outer end of the rightmost shaft 5, is a driven gear 12 having a relatively wide working face adapted for constant mesh with a driving gear 13. Journaled at each end thereof in the end posts, is a rotatable screw shaft 14 having fixed to the end thereof a driven gear 15, likewise engageable by the driving gear 13.

Splined upon the screw shaft for longitudinal movement therealong, is a carriage block 16 on which is carried a horizontal radius bar 17 pivoted thereto about a bolt 18. The radius bar is bifurcated in the front end thereof to receive the bottom end of an upstanding cutter post 19 pivotably connected to the radius bar by a pin 20. At the top thereof, the cutter post is bifurcated for reception of the stem 21 of a cutter head 22 having an arcuate beveled frontal nosing 23. This cutter head assembly is held in place by a flexible band 24 looped around the front end thereof and fastened to the cutter post by a bolt 24' securing the end portions of the looped band. Passed around the outer surface of this band, is a relatively thin flexible blade 25, the top marginal edge of which is adjustable in relation to the nosing 23 whereby to provide a paring edge by virtue of the angular space which intervenes therebetween. The blade may be held in place by suitable tabs formed along the marginal edges of the band and projecting therefrom and bendable against the abutting marginal edge of the blade, as at 25'.

The radius bar 17 has a bifurcated rear portion forming a pair of parallel bearing members 26 adapted to receive therebetween an upright cylindrical post 27 which is secured at the bottom thereof to the base plate 1, (Fig. 4).

As the carriage block 16 moves along the screw shaft 14, the bearing members 26 work against the post 27 thereby restraining the rear portion of the radius bar which pivots about the bolt 18. Thus, the front end of the radius bar and the cutter post 19 carried therewith move in substantially an arcuate path in relation to the orange A. The paring edge embraced in the cutter assembly carried at the top of the cutter bar thus engages the periphery of the orange along the contour thereof by virtue of the arcuate movement of the front portion of the radius bar, as shown by its full line and broken line positions in Fig. 4.

The cutter bar (Fig. 5) may be urged toward the fruit by a cord or spring having suitable elastic characteristics, as at 28, one end of this cord attaching to the cutter bar and the opposite end to the radius bar. If desired, a suitable stop member 29 may be screw fastened to the radius bar for the purpose of serving as a stop member against the excessive inclination of the cutter post 19 in the direction of the fruit.

Referring now to Figs. 1 and 3, the driving gear 13 has rotatable and slideable movement upon a stub shaft 30 which threads into the post 3 and, at its outer end, terminates in a screw head 31 serving as a stop member to limit the rightward movement of the driving gear. A handle 33 is connected, through a bracket 32, with the driving gear to effect both rotatable and slideable movement thereof, as will be understood.

As viewed in Figs. 1 and 3, the driving gear is in constant meshing engagement with driven gear 12 and likewise meshes with gear 15, whereby to impart rotation to the fruit clamping assembly in the direction of the arrow in Fig. 5, while simultaneously rotation is imparted to the screw shaft 14 to move the carriage block in a given direction. When the carriage block reaches one end of the screw shaft, the driving gear is shiftable from its position shown in the drawing to disengage gear 15 and engage a reversing gear 34 (Fig. 2), which is keyed to a rotatable stub shaft 35, journaled in post 3.

The stub shaft 35 also carries a driven gear 36 keyed thereto and rotatable with reversing gear 34. Gear 36 is in constant mesh with driven gear 15, so that when the driving gear 13 is shifted to the right, as viewed in the drawing, and handle 33 is continued in rotation in the same direction as heretofore, the direction of rotation of driven gear 15 will be reversed through intervening gears 34 and 36 whereby to reverse the travel of the carriage block 16 and the paring assembly carried at the top of the cutter post 19 will begin a cut in the direction opposite to that theretofore made.

When this last described cut has been completed, that is to say when the carriage block arrives at the limit of its travel along screw shaft 14, the driving gear 13 is again shifted back to the position shown in the drawing and the reversing cycle again repeated.

Thus, the machine provides a fruit peeling means including a paring element which travels in an arcuate path to follow the contour of the orange, and gear reversing means to return the paring element along this contour in a direction opposite to that theretofore followed without changing the directional rotation of the driving gear whereby the machine is actuated.

By the construction herein described, the invention provides a novel arrangement of parts to produce a fruit peeler attaining the objects hereinbefore announced.

Having thus described the invention and the mode of its operation which will be apparent from this description, what I claim as new and desire to secure by Letters Patent of the United States, is:

1. In a fruit peeler, the combination with a frame having fruit clamping means journaled therein for rotation of said fruit, of a rotatable screw shaft journaled in said frame and a carriage block splined thereon for longitudinal movement therealong, a radius bar carried by said block and pivoted thereto for swingable movement of one end of said bar, a cutter post carried by said bar at the swingable end thereof and a paring blade carried by said cutter post, means restraining the end of said bar opposite to said swingable end whereby to pivot said bar upon the longitudinal movement of said block to effect the movement of said swingable end and the cutter post and paring blade carried thereby in a substantially arcuate path relative to said fruit, and means operable to effect the simultaneous rotation of said fruit clamping means and said screw shaft.

2. The invention as defined in claim 1, and: said restraining means comprising an upright post arranged in said frame and said bar having a longitudinal slot formed in the end portion thereof opposite to said swingable end for engagement by said post whereby to restrain said slotted end portion against longitudinal movement.

3. In a fruit peeler, the combination with a frame having fruit clamping means journaled therein for rotation of said fruit, of a rotatable screw shaft journaled in said frame and a carriage block splined thereon for longitudinal movement therealong, a radius bar carried by said block and pivoted thereto, a cutter post carried by said radius bar at the outer end thereof and paring means carried by said cutter post and engageable with said fruit along the peripheral surface thereof, means restraining the inner end of said radius bar whereby to pivot the outer end thereof upon the longitudinal movement of said carriage block to effect movement of said paring means in substantially an arcuate path about said fruit, a driven gear for said fruit clamping means and a driving gear in constant mesh therewith, a driven gear for said screw shaft engageable with said driving gear to advance said carriage block in one direction, a reversing gear train operable by said driving gear and in constant driving relation with said screw shaft gear, said driving gear being shiftable between engagement with said screw shaft gear and engagement with said reversing gear train whereby to return said carriage block in the opposite direction and continue the directional rotation of said fruit clamping means gear.

4. A fruit peeler comprising a frame, a rotatable clamp journaled therein and adapted to grip said fruit for rotation therewith, a rotatable screw shaft journaled in said frame and a carriage block splined thereon for longitudinal movement therealong, a horizontal radius bar carried by said block and pivotably connected thereto for oscillation in a horizontal plane, an upstanding cutter post carried by said radius bar adjacent the front end thereof and pivoted thereto for oscillation in a vertical plane, a paring blade arranged on said cutter post at the top thereof and engageable with the periphery of said fruit, a stationary post arranged in said frame and engageable by the rear end portion of said radius bar for the restraint thereof against longitudinal movement whereby to pivot said bar upon the longitudinal movement of said block and swing the front end of said bar and the cutter post and paring blade carried thereby in a substantially arcuate path relative to said fruit, and means connecting said fruit clamp and said screw shaft operable to effect the simultaneous rotation thereof.

JUAN GUTIERREZ SALIDO.

REFERENCES CITED

The following references are of record in the file of this patent:

UNITED STATES PATENTS

| Number | Name | Date |
|---|---|---|
| Re. 9,774 | Whittemore | June 21, 1881 |
| 262,896 | Hoff | Aug. 15, 1882 |
| 310,196 | Goodell | Jan. 6, 1885 |
| 411,598 | Lewis | Sept. 24, 1889 |
| 1,399,858 | Gabrio | Dec. 13, 1921 |
| 2,361,241 | Rogers | Oct. 24, 1944 |